United States Patent [19]

Yamada et al.

[11] Patent Number: 4,841,935
[45] Date of Patent: Jun. 27, 1989

[54] VARIABLE AIR INDUCTION CONTROL SYSTEM FOR INTERNAL COMBUSTION ENGINE

[75] Inventors: Hideji Yamada; Akira Nagao; Toyohei Nakajima; Yukihiko Suzaki; Masao Jogen; Akira Tanaka, all of Wako, Japan

[73] Assignee: Honda Giken Kogyo Kabushiki Kaisha, Tokyo, Japan

[21] Appl. No.: 111,743

[22] Filed: Oct. 23, 1987

[30] Foreign Application Priority Data

Oct. 24, 1986 [JP] Japan .................................. 61-251583
Oct. 24, 1986 [JP] Japan .................................. 61-251584

[51] Int. Cl.$^4$ ............................................. F02B 15/00
[52] U.S. Cl. ................................... 123/432; 123/435; 123/585
[58] Field of Search .................. 123/90.11, 435, 432, 123/308, 585

[56] References Cited

U.S. PATENT DOCUMENTS

| | | | |
|---|---|---|---|
| 3,682,152 | 8/1972 | Müller Berner | 123/90.11 |
| 4,000,756 | 1/1977 | Ule et al. | 123/90.11 |
| 4,020,803 | 5/1977 | Thuren et al. | 123/90.11 |
| 4,455,980 | 6/1984 | Sasayama et al. | 123/435 |
| 4,524,739 | 6/1985 | Kashiwaya et al. | 123/585 |
| 4,693,222 | 9/1987 | Itou et al. | 123/432 |
| 4,700,684 | 10/1987 | Pischinger et al. | 123/90.11 |

FOREIGN PATENT DOCUMENTS 217722 12/1983 Japan .................................. 123/435

Primary Examiner—E. Rollins Cross
Attorney, Agent, or Firm—Armstrong, Nikaido, Marmelstein, Kubovcik & Murray

[57] ABSTRACT

A variable air induction control system for an internal combustion engine. The engine intake passage is divided into a long and small diameter main passage and a short and large diameter auxiliary passage. The auxiliary passage is provided with a valve which is opened and closed to adjust the air flow rate. The system is arranged such that, in accordance with the cylinder pressure, the intake air passes through the main intake passage during low speed engine operation and through both the main and auxiliary passages during high speed engine operation, whereby the air induction efficiency (charging efficiency) is enhanced and the engine output increased. As knocking is more likely to occur when the air induction efficiency is high, the opening/closing of the valve is controlled depending on whether or not knocking occurs. Moreover, it may be arranged such that when knocking does occur, it is first coped with by retarding the ignition and if knocking cannot be eliminated in this way, the air intake is adjusted.

22 Claims, 12 Drawing Sheets

VARIABLE AIR INDUCTION CONTROL SYSTEM FOR INTERNAL COMBUSTION ENGINE

BACKGROUND OF THE INVENTION

1. Field of the Invention

This invention relates to a variable air induction control system for an internal combustion engine, more particularly to a variable air induction control system for an internal combustion engine which is equipped with a main air intake passage and an auxiliary air intake passage provided with an air flow rate control valve and the amount of intake air supplied to the engine is variably controlled in response to at least one engine operating condition of the engine.

2. Description of the Prior Art

In an internal combustion engine which is equipped with a main intake passage and an auxiliary intake passage and with an air flow rate control valve in the auxiliary intake passage which is opened and closed in response to at least one engine operating condition, it is known to control the operation of the engine by, for example, controlling the ignition timing thereof. A system for carrying out such control is disclosed, for instance, in Japanese Laid-open Patent Application No. 58(1983)-48776.

In connection with the air intake characteristics of an internal combustion engine, it is known that the region providing maximum engine output is determined mainly by the length and diameter of the air intake passage. Thus, when an air intake system is designed with primary attention given to performance in the low engine speed operating region, the air intake characteristics become poor in the high engine speed operating region. Conversely, when priority is given to the high engine speed operating region, the air intake characteristics in the low engine speed operating region will suffer. Thus, to realize improved air induction efficiency (charging efficiency) in both the high and low engine speed operating regions, there was developed the aforesaid system having main and auxiliary air intake passages and an air flow control valve in the auxiliary air intake passage which is opened and closed in response to one or more engine operating conditions such as the engine speed and the degree of throttle valve opening.

In this prior art system, in order to improve engine output ignition timing is controlled in response with the opening and closing of the valve in the auxiliary intake passage as well as on the main engine operating conditions including engine speed and engine load. However, such a control system is still insufficient and indirect for maximizing the engine output, since it disadvantageously becomes necessary to carry out an additional operation to compensate the ignition timing for other engine operating conditions as well as for such environmental conditions as the intake air temperature and the coolant temperature.

Also, while it is possible to realize increased engine output by variably controlling the flow rate of air supplied to an internal combustion engine so as to improve air induction efficiency, such control is unfortunately accompanied by increased risk of knocking. The aforesaid prior art system, in fact, leaves much to be desired with regard to regards knock prevention.

SUMMARY OF THE INVENTION

In view of the aforesaid shortcomings of the prior art, it is an object of the present invention to provide a variable air induction control system for an internal combustion engine wherein an engine operation is controlled more directly by ascertaining the state of combustion in the engine, a factor having a close proportional relation to the engine output, and the air flow rate in the auxiliary air intake passage is controlled on the basis of the ascertained state of combustion. This system provides more effective air induction efficiency (charging efficiency) and as a result not only enables an improvement in engine output but also eliminates the need to carry out compensation for changes in the engine operating conditions and environmental conditions.

Another object of the invention is to provide a variable air induction control system for an internal combustion system which enables improvement of the engine output by optimizing the air induction efficiency in response to at least one engine operating condition while at the same time enabling effective avoidance of knocking.

For achieving the objects, the present invention provides a variable air induction control system for an internal combustion engine, comprising: means for detecting combustion state of a combustion chamber of the engine disposed in the vicinity thereof, means for detecting cylinder pressure on the basis of the output of the combustion state detection means, a main air intake passage means for introducing air into the combustion chamber through an air cleaner, an auxiliary air intake means branched of the main air intake passage means for introducing air into the combustion chamber through the air cleaner, a valve means provided at an appropriate portion of the auxiliary air intake means for controlling air flow rate through the auxiliary air intake means, means for controlling opening/closing of the valve means on the basis of the outputs of cylinder pressure detection means and a valve actuating means for driving the valve means in response to the output of the valve opening/closing control means. Said control means controls the degree of opening/closing of the valve means to constantly maximize the cylinder pressure detected for the cylinder.

The above and other features of the present invention will become apparent from the following description made with reference to the drawings.

DESCRIPTION OF THE PREFERRED EMBODIMENTS

Embodiments of the invention will now be explained with reference to the drawings.

Figure 1:
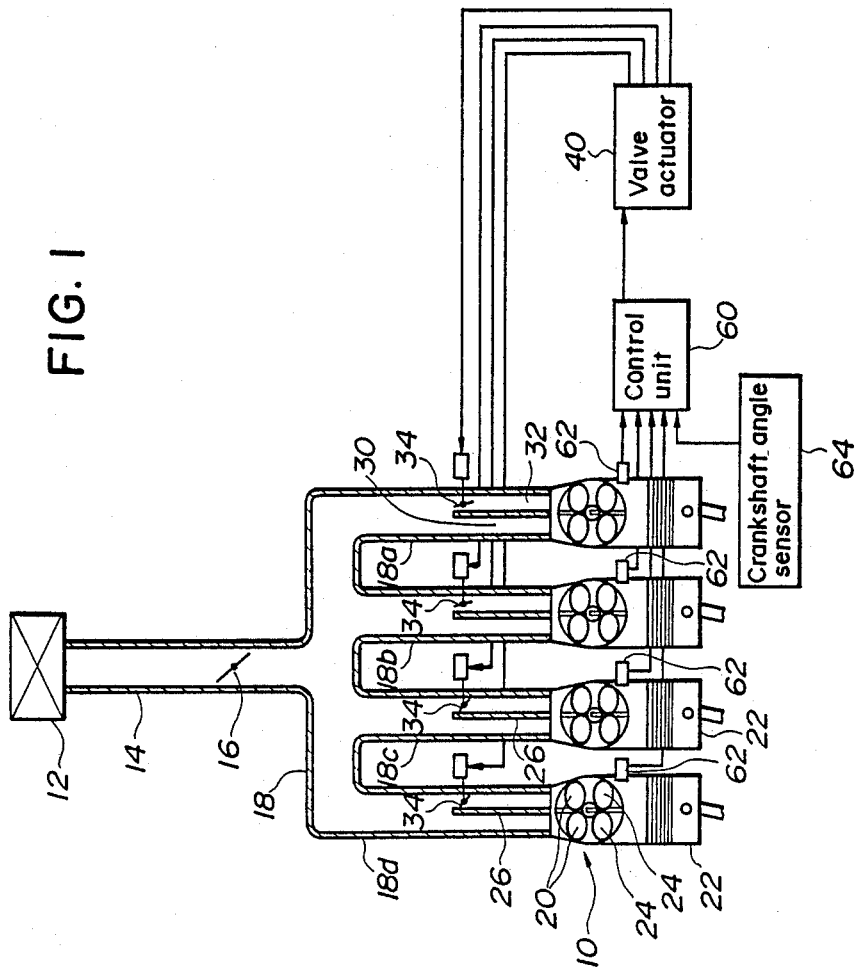
FIG. 1 is a schematic overall view of a variable air induction control system for an internal combustion engine according to the present invention.
Figure 2:
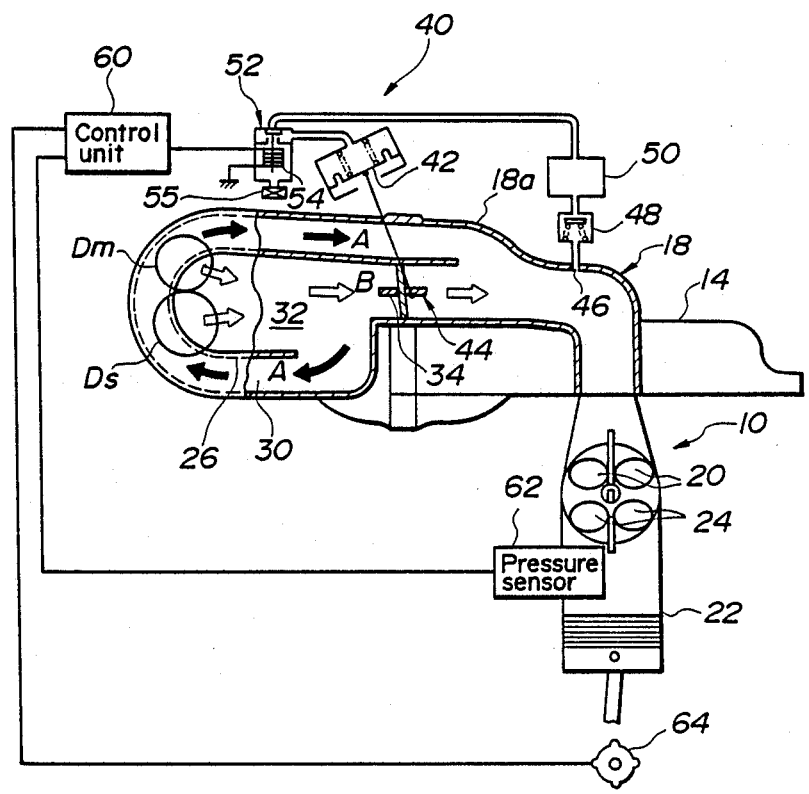
FIG. 2 is an explanatory sectional view taken through one of the cylinders of the engine and illustrating the structural details of a main portion of the system.

FIG. 1 gives a schematic view of the overall arrangement of the system, while FIG. 2 is a sectional view for illustrating the main portion of the system with respect to one cylinder thereof.

Referring to FIG. 1, reference numeral 10 denotes an internal combustion engine which, in the case illustrated, has four cylinders. The internal combustion engine 10 has an air cleaner 12 to which is connected an air intake passage 14. The air intake passage 14 is provided at an appropriate portion thereof with a throttle valve 16 which is linked to an accelerator pedal (not shown) at the operator's seat. At an appropriate position downstream of the throttle valve 16, the air intake passage 14 is connected with an intake manifold 18 which, at an appropriate position, separates into four branches 18a, 18b, 18c and 18d. Each of the branches communicates with a combustion chamber (not shown) through a pair of intake ports 20, 20 having respective valves (not shown) by which they can be opened and closed. Thus, intake air drawn in through the air cleaner 12 passes into the intake manifold 18 while having its flow rate adjusted by the throttle valve 16, and then passes through the branches 18a-18d to the respective intake ports 20. Fuel is supplied by fuel injectors (not shown) located in the vicinity of the air intake ports. The air drawn in is mixed with fuel at this point, whereafter it is drawn into the respective combustion chambers to be ignited by associated ignition plugs (not shown). As a result, a piston 22 in each cylinder reciprocates vertically. The exhaust gas leaves the combustion chamber through a pair of exhaust ports 24, 24 which are openable and closable by valves (not shown), and then passes through an exhaust manifold (not shown) and leaves the engine.

The branches 18a, 18b, 18c and 18d of the intake manifold 18 are each separated into a main air intake passage 30 and an auxiliary air intake passage 32 by a partition 26. As best shown in FIG. 2, the main air intake passage 30 is formed to have a greater length than the auxiliary air intake passage 32 so as to enhance the pulsation effect in the low engine speed operating region, while its diameter Dm is made smaller than the diameter Ds of the auxiliary air intake passage 32 so as to increase the inertial effect of the intake air in the low engine speed operating region. As a result, the dynamic effect of the intake air is increased in the low engine speed operating region. More specifically, as was mentioned earlier, the arrangement is such that the intake air will pass through the longer, smaller diameter main intake passage during relatively low speed operation of the engine and will pass through both the main air intake passage and the shorter, larger diameter auxiliary intake passage during relatively high speed operation of the engine.

Moreover, the auxiliary air intake passage 32 is provided at an appropriate part thereof with a bypass valve 34 for controlling the intake air flow rate. The opening and closing of the bypass valve 34 is controlled by a valve actuator 40. The valve actuator 40 has a control diaphragm 42 one side of which is connected via a link mechanism 44 to the bypass valve 34 and the other side of which has negative pressure from an aperture 46 opened at the intake manifold through a check valve 48 and a vacuum tank 50. The amount of the negative pressure applied is adjusted by turning on and off a solenoid 54 of a solenoid valve 52. More specifically, when the solenoid 54 is turned on, the negative pressure acts on the control diaphragm 42, whereby the bypass valve 34 is closed and the intake air is passed through the smaller diameter main air intake passage 30 for low speed engine operation, as indicated by the arrows A. On the other hand, when the solenoid 54 is turned off, an air introduced through a second air cleaner 55 acts on the control diaphragm 42 and the bypass valve 34 is opened by a spring (not shown) so that intake air passes not only through the main air intake passage 30 but also through the large diameter auxiliary air intake passage 32 for high speed engine operation, as indicated by the arrows B. The operation of the valve actuator 40 is controlled by a control unit 60.

For each cylinder, at an appropriate location in the vicinity of the combustion chamber, there is provided a piezoelectric pressure sensor 62 for detecting the state of combustion in the cylinder. The outputs of the piezoelectric pressure sensors 62 are forwarded to a charge amplifier (not shown) for charge/voltage conversion and then sent to the control unit 60. There is further provided a crankshaft angle sensor 64 constituted of a magnetic pickup or the like appropriately disposed in the vicinity of a distributor (not shown) or other rotating member of the engine for detecting the crank angle of the pistons 22. The crankshaft angle sensor 64 produces a cylinder identification signal once every 720 degrees rotation of the engine crankshaft, TDC (top dead center) signals once every 180 degrees rotation of the crankshaft and unit angle signals once every 30 degrees rotation of the crankshaft. These signals are forwarded to the control unit 60.

Figure 3:
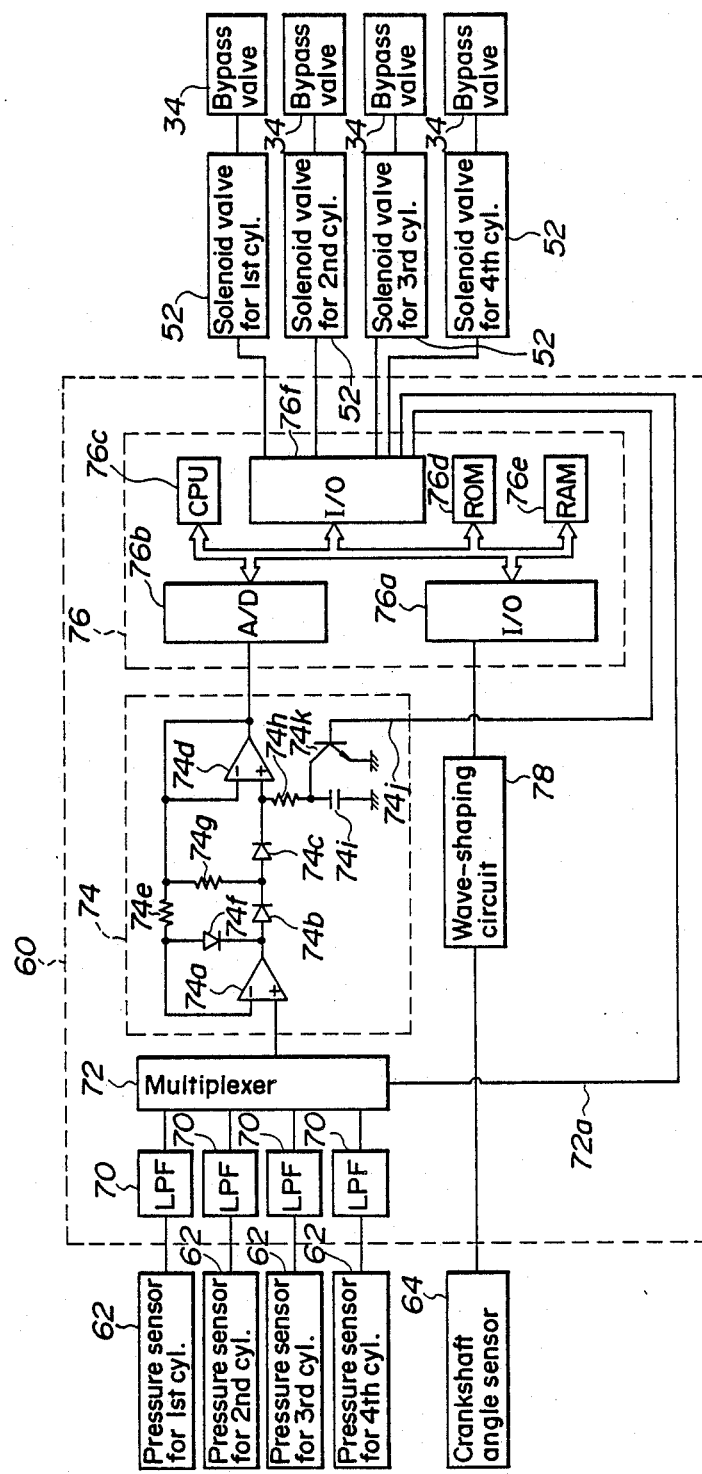
FIG. 3 is a block diagram showing the structural details of a control unit of the system.
Figure 4:
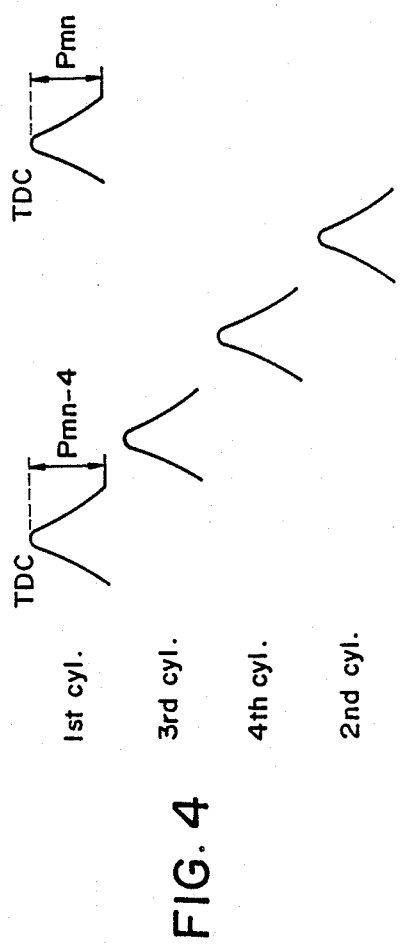
FIG. 4 is a graph for explaining the waveforms of signals output to the control unit by pressure sensors.

The control unit 60 is illustrated in detail in FIG. 3. After being charge-voltage converted, the outputs from the four piezoelectric pressure sensors 62 are applied to respective low pass filters 70 which pass only the low frequency components thereof, whereby there are obtained pressure value outputs indicating the state of combustion in the respective cylinders, such as shown in FIG. 4. The outputs from the low pass filters 70 are sent to a multiplexer 72 which is controlled by commands from a CPU (central processing unit) to be described later so as to forward the outputs from the filters 70 to a peak hold circuit 74 sequentially at prescribed crankshaft angles. The circuit 74 includes a first operational amplifier 74a which receives the output of the multiplexer 72 on its non-inverting input terminal. The output terminal of the first operational amplifier 74a is connected through diodes 74b, 74c to the non-inverting input terminal of a second operational amplifier 74d connected with a voltage follower, and the output of the second operational amplifier 74d is negatively fed back through a resistor 74e to the inverting terminal of the first operational amplifier 74a. The negative feedback circuit between the first and second operational amplifiers includes a diode 74f and a resistor 74g. The connection line between the diode 74c and the second operational amplifier 74d is connected to ground through a resistor 74h and a capacitor 74i and also to the collector terminal of a transistor 74k which is operated through a reset signal line 74j. The peak hold circuit 74 holds the peak value forwarded through the multiplexer 72 from the low pass filters 70.

The stage following the peak hold circuit 74 is a microcomputer 76. The microcomputer 76 is constituted of an input interface 76a, an A/D (analog/digital) converter 76b, a CPU (central processing unit) 76c, a ROM (read-only memory) 76d, a RAM (random access memory) 76e and an output interface 76f. The output of the peak hold circuit 74 is input to the microcomputer through the A/D converter 76b where it is digitized on command from the CPU 76c.

The output of the crankshaft angle sensor 64 is first shaped in a wave-shaping circuit 78 and then input to the microcomputer via the input interface 76a for temporary storage in the RAM 76e. The CPU 76c identifies the cylinders on the basis of the output of the crankshaft angle sensor 64, detects the TDC position of the respective sensors, issues commands via a signal line 72a for switching over the multiplexer 72 and issues commands via the reset signal line 74j for resetting the peak hold circuit 74. The CPU 76c also executes a command program stored in the ROM 76d so as to calculate the engine speed from the unit angle signals output by the crankshaft angle sensor 64, calculates a control value from the pressure value stored in the RAM 76e, and outputs the calculated control value to the bypass control solenoid valve 52 so as to control the open/close state of the bypass valve 34 of the auxiliary air intake passage 32.

Figure 5:
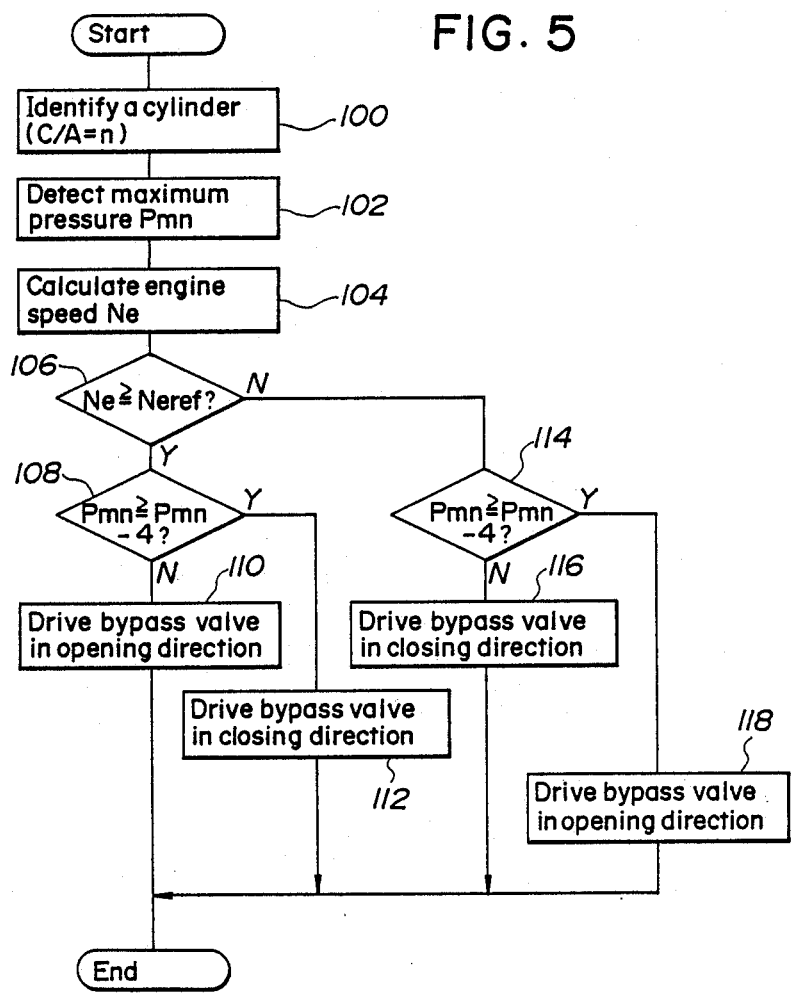
FIG. 5 is a flowchart showing the operation of the control unit.

The operation of the system will now be explained with respect to the flowchart of FIG. 5.

To begin with, the cylinder in which combustion is currently occurring is identified in step 100 and assigned a cylinder address ($C/A=n$). This operation is carried out using the cylinder identification signal and the cylinder TDC signals output by the crankshaft angle sensor 64.

The procedure then moves to step 102 where the maximum cylinder pressure Pmn is detected for the current cylinder ($C/A=n$). As shown in FIG. 4, generally the air/fuel mixture is ignited at an appropriate crankshaft angle BTDC (before top dead center) and the combustion pressure reaches maximum in the vicinity of 10 to 20 degrees ATDC (after top dead center). Thus, the CPU 76c issues commands to switch the gates of the multiplexer 72 so as to read the output of the piezoelectric pressure sensor 62 for each cylinder over a period extending from a prescribed angle BTDC to around 30 degrees ATDC, and also issues commands to the A/D converter 76b so as to read out the converted values and temporarily store them in the RAM 76e.

The procedure then advances to step 104 where the engine speed Ne is calculated and further to step 106 where it is judged whether or not the detected engine speed is higher than a prescribed reference engine speed Neref, which may, for example, be 3,500 rpm.

When the detected engine speed is higher than the reference engine speed Neref, i.e. when the engine is in a high speed operating region, the procedure moves to step 108 where it is judged whether or not the maximum cylinder pressure Pmn is higher than the maximum cylinder pressure Pmn-4 detected four firings earlier, i.e. whether or not it is higher than the maximum cylinder pressure Pmn-4 detected for the same cylinder the last time it fired. As was well-known, there is a close proportional relation between engine output and maximum combustion pressure. Thus, since there is also naturally a proportional relation between air induction efficiency (charging efficiency) and combustion pressure, if the pressure during the current cycle should be lower than that during the preceding cycle, this means that the air induction efficiency is not adequate. Therefore, in such case, the procedure moves to step 110 where the bypass valve 34 is driven in the opening direction. That is to say, the control unit 60 issues a signal for turning the bypass control solenoid valve 52 off, thereby stopping the supply of negative pressure to the bypass control diaphragm 42. As a result, the bypass valve 34 moves in the opening direction under the force of a spring (not shown) of the link mechanism 44, causing the intake air to flow into the combustion chamber through the shorter and larger diameter auxiliary air intake passage 32, as indicated by the arrows B.

If the detected value for the current cycle is found to be higher in the step 108, then in step 112 the bypass valve 34 is moved in the closing direction. This operation is achieved by carrying out the operation of the step 110 in reverse. More specifically, the solenoid valve 52 is turned on to cause the negative pressure to act on the control diaphragm 42, whereby the bypass valve 34 is driven in the closing direction through the link mechanism 44. As a result, almost all of the intake air will pass into the combustion chamber through the longer, smaller diameter main air intake passage 30, as indicated by the arrows A. As was mentioned earlier, the valve actuator 40 is not constituted such that the opening and closing of the bypass valve 34 is carried out by two-position control so that it is either fully open or fully closed, but is constituted such that the amount of negative pressure acting on the control diaphragm 42 is changed stepwise, whereby the bypass valve 34 is opened and closed in fine increments in proportion to the magnitude of a difference pressure $dPm$ ($=Pmn-Pmn\text{-}4$). Namely, the solenoid valve 52 is applied a current in a PWM duty control wherein the current flowing in a prescribed period is varied, as is known in the art.

In the step 106, if it is judged that the engine is in a low speed operating region, the detected values for the current and preceding cycles are similarly compared in step 114, and if it is found that the maximum cylinder pressure Pmn for the current cycle is lower than the maximum cylinder pressure Pmn-4 for the preceding cycle, the procedure moves to step 116 where the bypass valve 34 is driven in the closing direction. This operation is accomplished by carrying out the operation of the step 110 (the operation carried out when the engine is in a high speed operating region) in reverse and results in almost all of the intake air being passed through the main air intake passage 30. Since, as mentioned earlier, the main air intake passage 30 is of smaller diameter and greater length than the auxiliary air intake passage 32, it becomes possible to increase the pulsation effect and the inertial effect of the intake air in the low engine speed operating region, whereby the overall induction efficiency can be improved. When the judgment in the step 114 is affirmative, the procedure moves to step 118 where the bypass valve 34 is driven in the opening direction. Similarly to what was explained in connection with the operation of the system during high speed engine operation, the bypass valve 34 is also stepwisely opened and closed in fine increments during low speed engine operation. As a result, the flow rate of the intake air passing through the auxiliary air intake passage 32 can be finely controlled so as to more effectively realize an improvement in engine output.

In the present embodiment of the invention, the control for opening and closing the bypass valve 34 is carried out based on the combustion pressures detected separately for each of the cylinders. As a result, there are the advantages that the air induction efficiency can be more effectively increased and that no need arises for carrying out the compensation for engine operating conditions and engine environment conditions that has been necessary in prior art systems. It should be noted that although the detected pressure Pmn is compared with that of the same cylinder four firings earlier, he pressure may be compared with that of the other cylinders such as that fired immediately before.

Figure 7B:
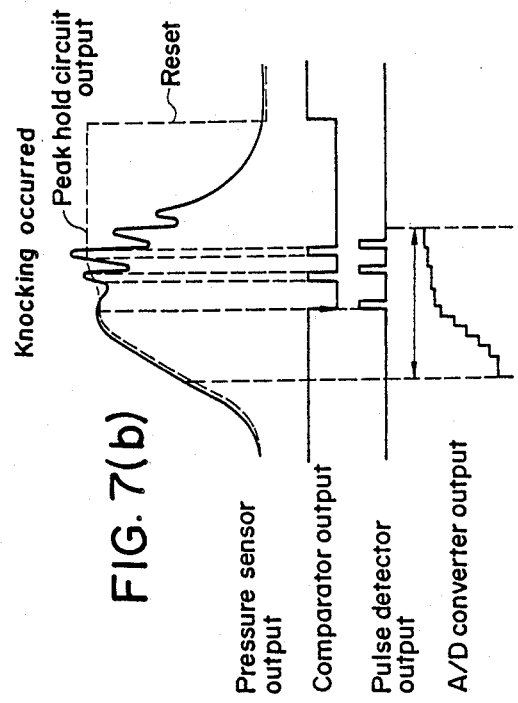
FIGS. 7(a) and 7(b) are waveform diagrams showing the operation of a knocking detection circuit of the control unit of FIG. 6.
Figure 7A:
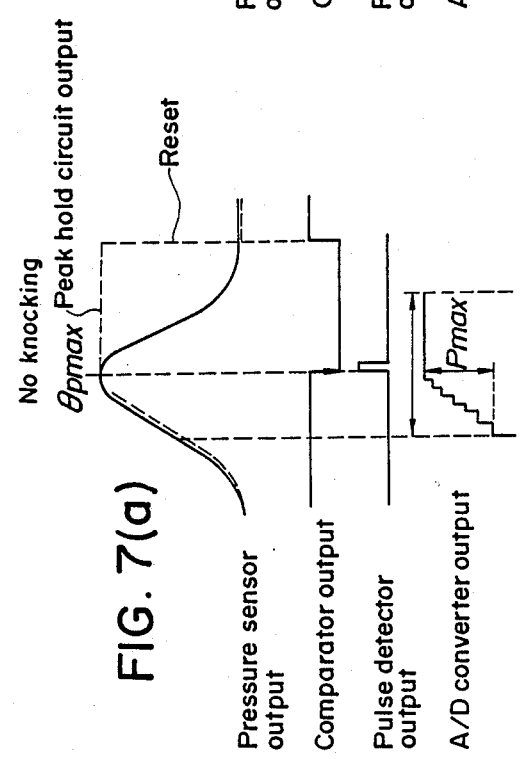
Figure 6:
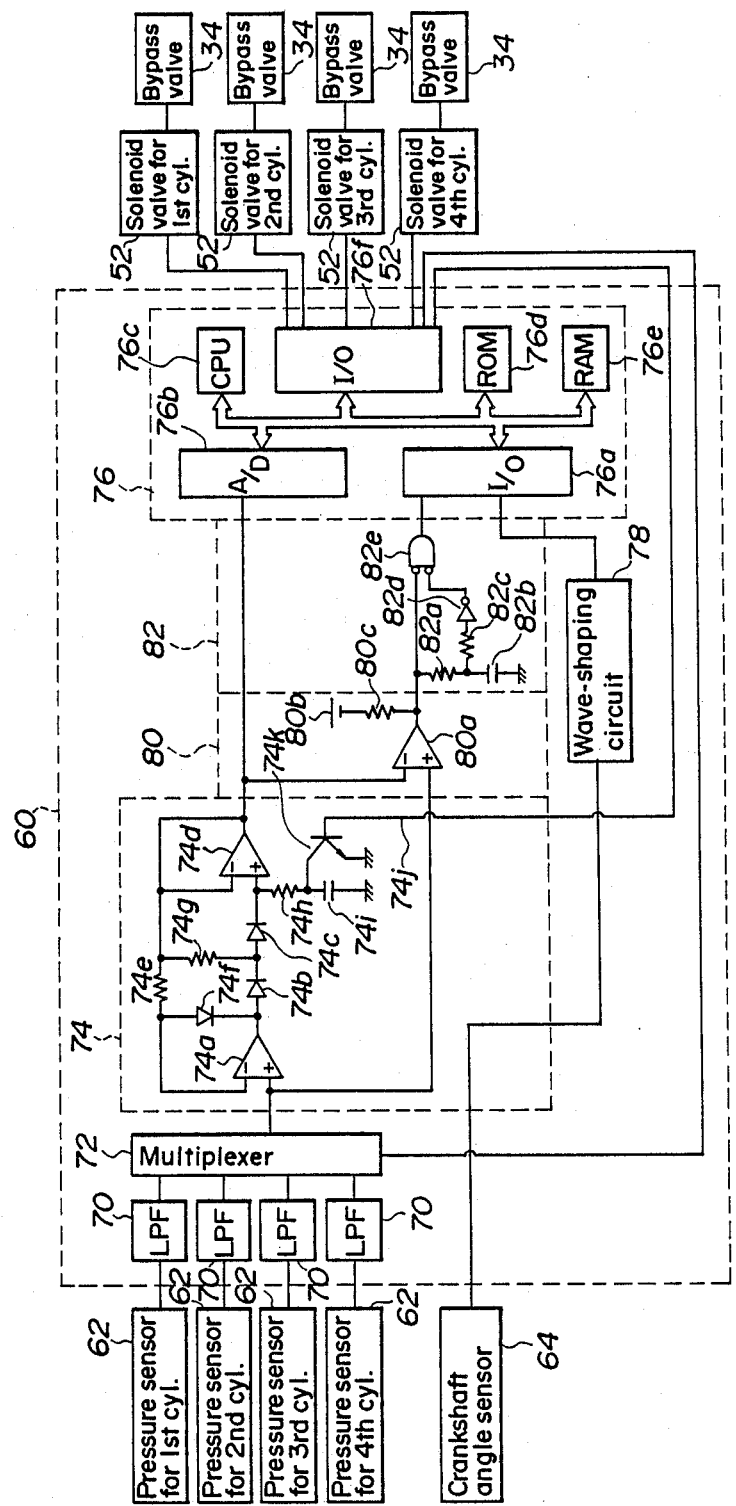
FIG. 6 is a block diagram of a control unit in accordance with a second embodiment of the invention.

FIG. 6 is a block diagram of the control unit 60 in accordance with another embodiment of the invention, which will now be described mainly with respect to its differences from the control unit 60 of the first embodiment. In this embodiment the cut-off frequency of the low pass filters 70 is increased so as to also pass a high frequency component including the knocking component, and a comparator 80 and a pulse trailing edge detector 82 are provided as stages following the peak hold circuit 74. The output of the peak hold circuit 74 is sent both directly to the microcomputer 76 and in parallel to the comparator 80. The comparator 80 is constituted of an operational amplifier 80a and a voltage source 80b connected to the output side of the operational amplifier 80a through a resistor 80c. The output of the peak hold circuit 74 is applied to the inverting terminal of the operational amplifier 80a and the output of the multiplexer 72 is applied to the non-inverting terminal thereof. Since a slight difference arises between the two inputs, as shown in FIG. 7, the comparator 80 produces a pulse at the maximum pressure position. The pulse trailing edge detector 82 consists of a resistor 82a, a capacitor 82b, a resistor 82c, an inventor 82d and a NOR gate 82e. The pulse trailing edge detector 82 detects the time at which the pulse output by comparator 80 falls and produces a timing pulse of a prescribed width easily processable by the succeeding stages of the system. As shown in FIG. 7, when knocking does not occur the pulse trailing edge detector 82 produces a single pulse at the time the maximum pressure value is reached (FIG. 7(a)) and in cases where knocking occurs and a high frequency wave component is superposed on the waveform it produces a signal not only at the said time but also at each time thereafter that the output of the pressure sensor (multiplexer) comes to exceed the peak hold output (FIG. 7(b)). Thus, by counting the number of pulses that occur it is possible to determine whether or not knocking has occurred. The output from the pulse trailing edge detector 82 is forwarded to the microcomputer 76 via the input interface 76a. Therefore, the CPU 76c of the microcomputer 76 is able to confirm whether or not knocking has occurred from the output of the pulse trailing edge detector 82. Also the crank angle $\theta$max at which the pressure becomes maximum can be detected by counting time lapse via a time counter, not shown, between the TDC position and a time when the pulse is produced.

Figure 8:
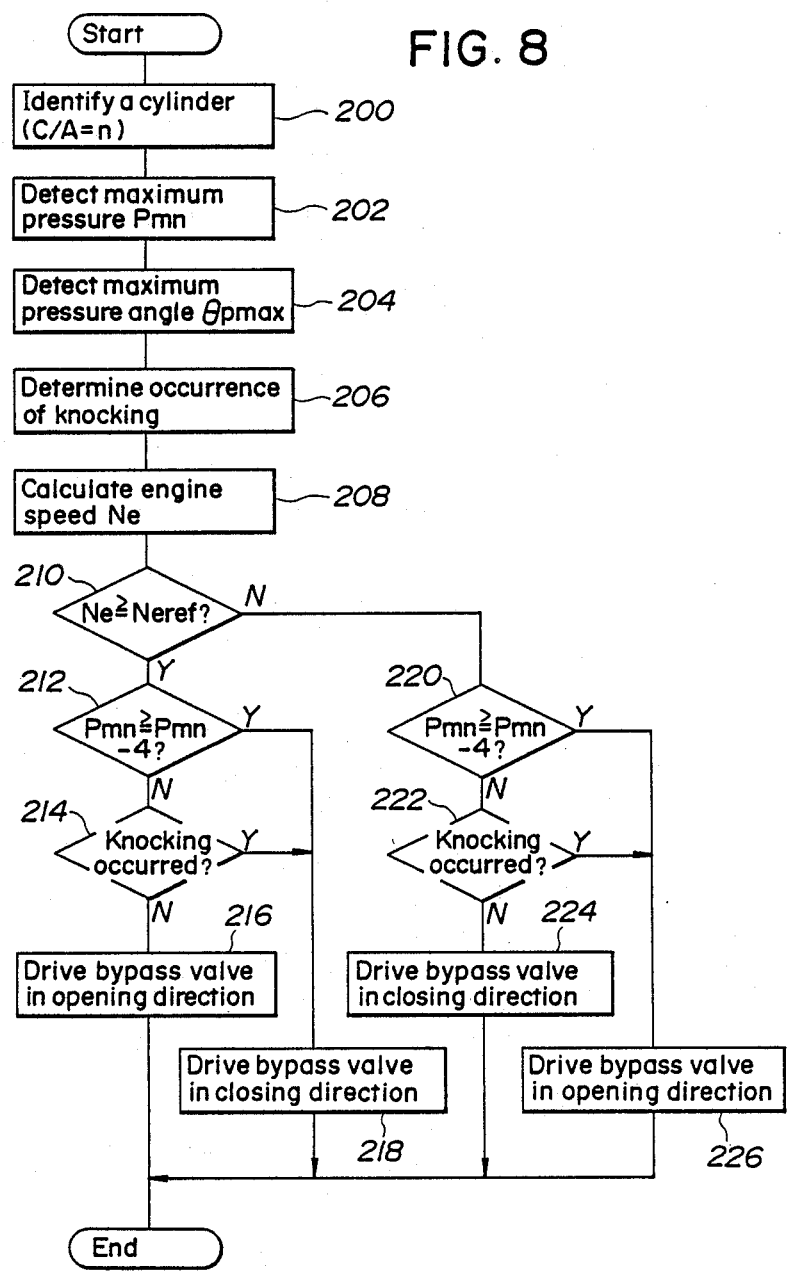
FIG. 8 is a flowchart showing the operation of the second embodiment of the invention.

The operation of this second embodiment of the invention will now be explained with reference to FIG. 8.

Similarly to the procedure in the first embodiment, the cylinder is first identified in step 200, whereafter the maximum cylinder pressure Pmn for this cylinder is detected in step 202. Nextly, in step 204 the crank angle $\theta$pmax at which the maximum cylinder pressure occurs is determined. Since the pressure reaches maximum in the vicinity of 10 to 20 degrees ATDC if properly burnt, it can be confirmed in view of the angle $\theta$pmax whether the maximum pressure is caused by a normal combustion. Then in step 206, it is determined whether or not knocking has occurred. This is done by counting the number of pulses output by the pulse trailing edge detector 82. Following this, the engine speed Ne is calculated in step 208, whereafter it is determined in step 210 whether or not the engine speed Ne exceeds a prescribed reference engine speed Neref of, for example, 3,500 rpm.

When it exceeds the reference value, the procedure moves to step 212 where, similarly to the procedure in the first embodiment, it is determined whether or not the maximum cylinder pressure Pmn for the current cycle is higher than the maximum cylinder pressure Pmn-4 for the preceding cycle. At this step, it is also determined whether the maximum pressure angle $\theta$pmax falls within the range of ATDC 10 to 20 degrees. As was explained earlier, when the pressure in the range of ATDC 10 to 20 degrees detected for the current cycle is lower than that detected for the preceding cycle, the air induction efficiency is inadequate and the bypass valve 34 needs to be driven in the opening direction. In this embodiment, however, prior to doing this, the procedure first moves to step 214 where it is determined on the basis of the result of the knocking detection carried out in the step 206 whether or not knocking has occurred in the cylinder concerned. When it is found that knocking has not occurred, the procedure moves to step 216 where the bypass valve 34 is driven in the direction of opening. If it is found in the step 212 that the detection value in the current cycle is larger, the procedure advances to step 218 where the bypass valve 34 is driven in the direction of closing. The bypass valve 34 is also driven in the direction of closing to reduce the air induction efficiency in the case were it is judged in the step 214 that knocking has occurred, since priority must be given to prevention of knocking.

If it is judged in the step 210 that the engine is in a low speed operating region, the procedure moves to step 220 where the detection values are similarly compared, and if it is found that the detection value for the current cycle is lower than that for the preceding cycle, the procedure moves to step 222 where it is judged whether or not knocking has occurred. If it is judged that knocking has not occurred the procedure goes to step 224 where the bypass valve 34 is driven in the closing direction. This is carried out by performing the operation of the step 216 for high engine speed operating condition in reverse and, as a result, nearly all of the intake air will pass through the main air intake passage 30, thus increasing the pulsation effect and the inertial effect of the intake air in the low engine speed operating region, whereby the overall induction efficiency can be improved. When the detection value for the current cycle is found to be higher and when knocking is found to have occurred, the bypass valve 34 is driven in the direction of opening (steps 220, 222 and 226). In the aforesaid control, similarly as in the first embodiment, the opening and closing of the bypass valve 34 is not carried out by two-position control so that it is either fully open or fully closed, but is carried out by the duty control either in fine increments or stepwise in proportion to the difference pressure $dPm$ ($=Pmn-Pmn$-4). Also, the value to be compared with in steps 212, 220 should not be limited to the pressure Pmn-4. Moreover, the arrangement can be such that the knocking intensity is judged from the number of output pulses and the opening/closing is carried out in fine increments in proportion to the so-determined intensity.

Figure 9:
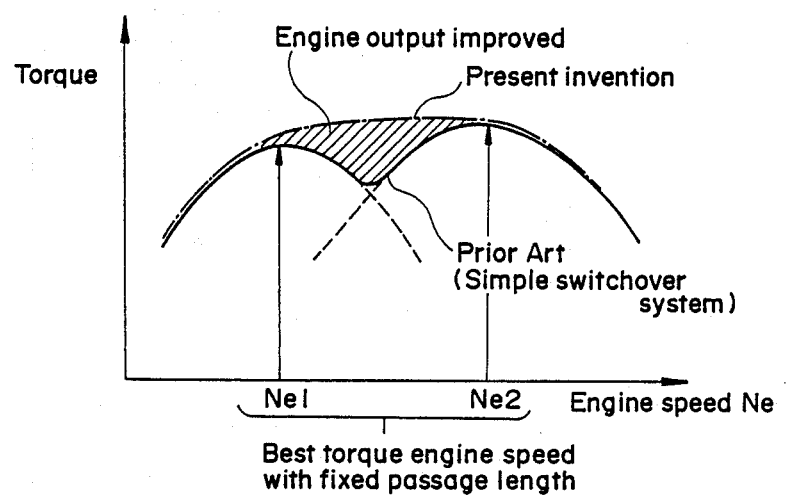
FIG. 9 is a waveform diagram for explaining the advantages of the second embodiment.

In the present embodiment, the opening/closing of the bypass valve 34 of the auxiliary air intake passage 32 can be controlled on the basis of the state of combustion in the engine, a factor which has a close relation to the engine output, while at the same time, when knocking is detected, it can be eliminated by reducing the air induction efficiency. Thus, it becomes possible to avoid knocking while simultaneously ensuring optimum engine output. The effect of this system vis a vis the simple switchover system of the prior art is shown in FIG. 9. In the present invention, since the pressure in the respective cylinders is detected and variable control is continuously conducted so as to maintain the pressure at maximum, the engine output can be improved by the amount indicated by the hatched region in the figure.

Figure 10:
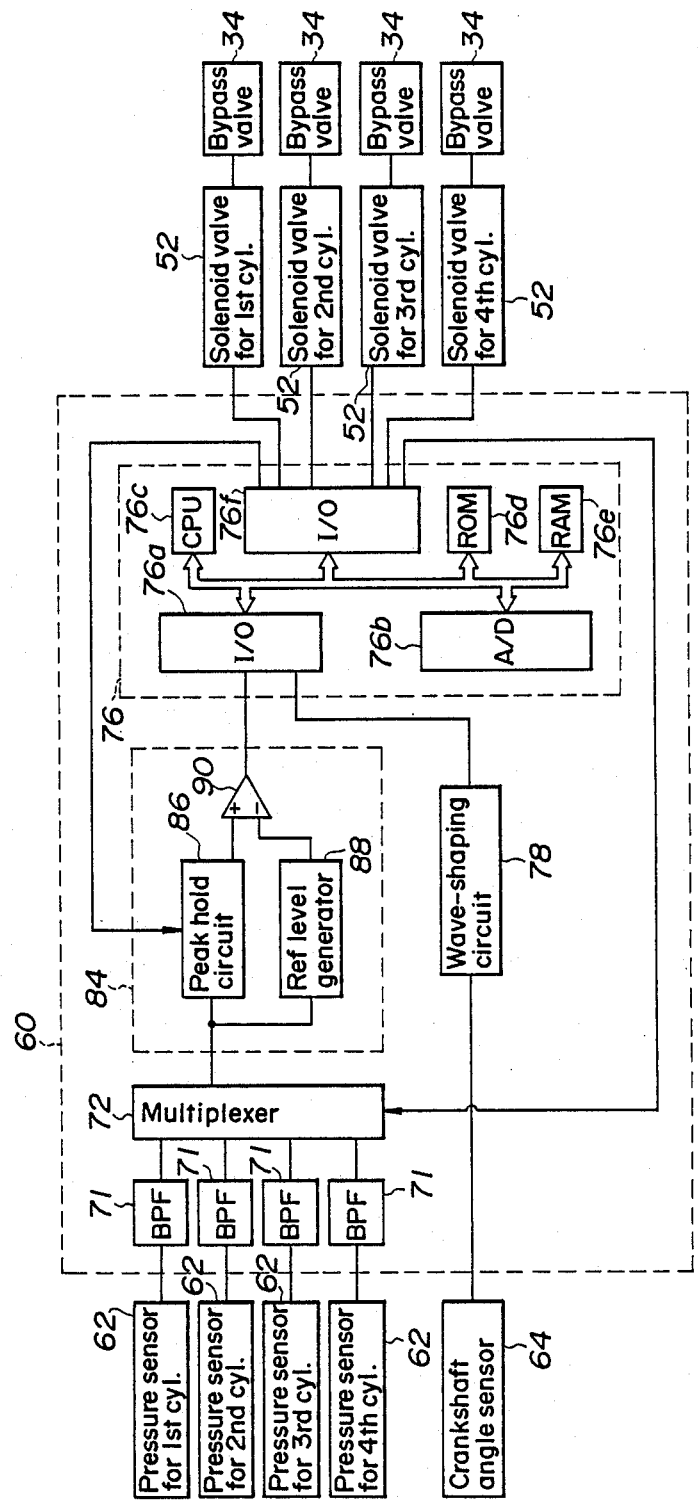
FIG. 10 is a block diagram of a control unit in accordance with a third embodiment of the invention.

FIG. 10 is a block diagram of the control unit 60 in accordance with a third embodiment of the invention. This embodiment differs from the first and second in that only the presence or absence of knocking is determined from the outputs of the piezoelectric pressure sensors 62 and opening and closing of the bypass valve 34 is controlled on the basis of the detected result. More specifically, the outputs of the piezoelectric pressure sensors 62 are forwarded through band pass filters 71 which allows to pass a frequency component including a knocking frequency component and the multiplexer 72 to a knocking detection circuit 84. The knocking detection circuit 84 is constituted of a peak hold circuit 86, a reference level generator 88 and a comparator 90. The outputs of the piezoelectric pressure sensors 62 are forwarded to the peak hold circuit 86 which holds the peak value received during a prescribed period in response to a command received from the CPU 76c. In parallel with this, the outputs of the piezoelectric pressure sensors 62 are also sent to a reference level generator 88 constituted as an integration circuit or the like, where the mean value thereof is calculated. The outputs of the peak hold circuit 86 and the reference level generator 88 are sent to a comparator 90. If the peak hold value is found to exceed the reference level, a high level signal indicating that knocking has occurred is produced and sent to the microcomputer 76. The knocking intensity is also detected from the number of times the peak hold value exceeds the reference level. The remainder of the system is the same as the first and second embodiments.

Figure 11:
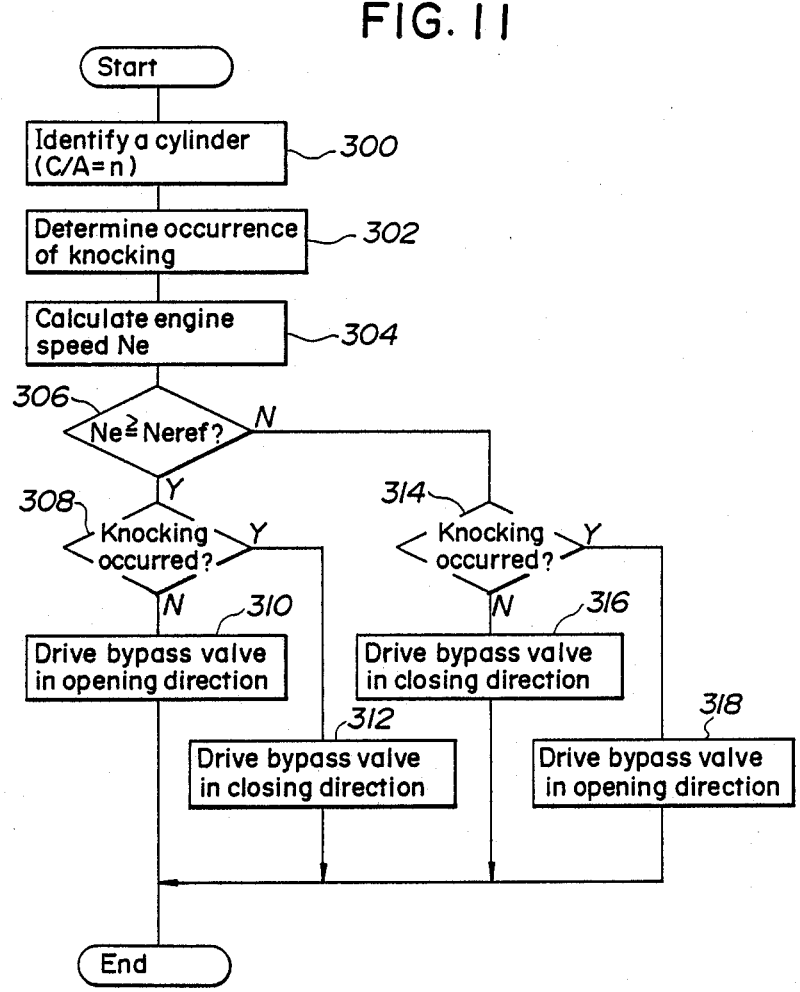
FIG. 11 is a flow chart of the operation of the third embodiment of the invention.

FIG. 11 is a flowchart showing the operation of the third embodiment, which will now be explained mainly with respect to the differences from the first and second embodiments. After the steps from that for identifying the cylinder to that for comparing the engine speed Ne (steps 300–306) have been executed, if it is determined that the engine is operating in a high speed region, it is next determined whether or not knocking has occurred (step 308) and if it has not, the bypass valve 34 of the auxiliary air intake passage 32 is driven in the opening direction. When knocking has occurred, the bypass valve 34 is driven in the closing direction (steps 310–312). Similarly, when the engine is operating in a low engine speed region, the induction efficiency is increased by carrying out the closing and opening of the bypass valve 34 in the reverse manner from the above, while at the same time eliminating knocking (steps 314–318). In this case too, the closing/opening is carried out incrementally in proportion to the knocking intensity.

In this embodiment, since the opening/closing of the bypass valve 34 is finely controlled in response to the presence/absence of knocking, it advantageously becomes possible to effectively eliminate knocking while at the same time increasing the air induction efficiency in the vicinity of the knocking limit.

Figure 12:
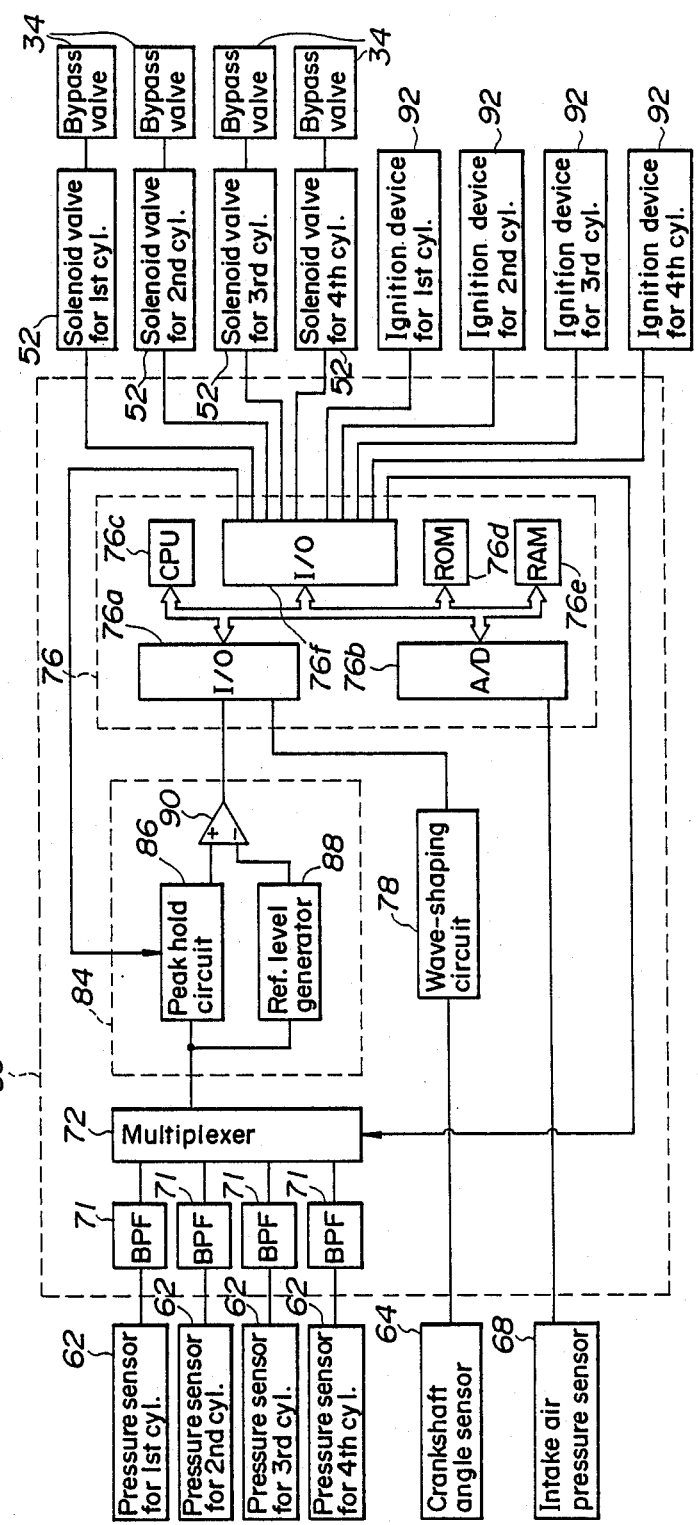
FIG. 12 is a block diagram of a control unit in accordance with a fourth embodiment of the invention.

FIG. 12 shows a fourth embodiment of the invention. In this embodiment, when knocking occurs an attempt is first made to eliminate it by retarding the ignition timing, and the air induction efficiency is reduced only if this attempt is not successful. The embodiment will be explained mainly in respect of how it differs from the first and second embodiments. An intake air pressure sensor 68 is provided at an appropriate position in the air intake passage 14 so as to enable detection of the engine load state from the intake air pressure, and each cylinder is provided with an ignition device 92. The microcomputer 76 retrieves a basic control value from a basic control map for ignition timing stored in the ROM 76d, using the values output by the crankshaft angle sensor 64 and the intake air pressure sensor 68 as address data, and also adjusts the retrieved basic control value as appropriate in view of the outputs of such other sensors as, for example, a coolant temperature sensor (not shown). Then after determining whether or not knocking has occurred on the basis of the output from the knocking detection circuit 84, it determines the final ignition timing for each cylinder and sends ignition commands to the respective ignition device 92.

Figure 13:
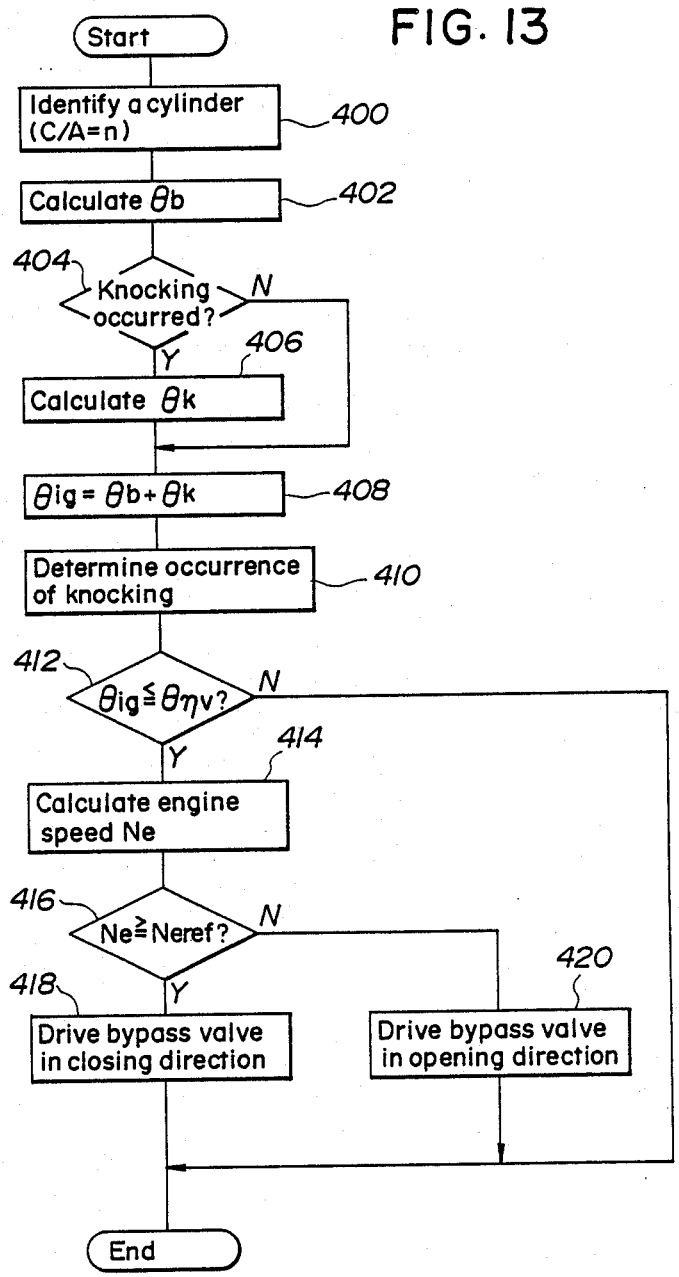
FIG. 13 is a flowchart showing the operation of the fourth embodiment of the invention.

The operation of this embodiment will now be explained with reference to the flowchart shown in FIG. 13. After cylinder identification in step 400, the procedure moves to step 402 where the basic ignition timing $\theta b$ is calculated for the cylinder concerned. The calculated is then compensated for temperature or the like.

Next, in step 404, it is determined whether knocking has occurred, more precisely whether knocking occurred in the same cylinder during the preceding cycle, and when it is found that knocking occurred, the procedure moves to step 406 where a knocking compensation value $\theta k$ for retarding the ignition timing by, for example, 1 degree is calculated. Then in step 408, the actual ignition timing $\theta ig$ is calculated by combining the basic ignition timing and the knocking compensation value, and an ignition command is issued through the ignition device 92 for the cylinder concerned.

The procedure then advances to step 410 where, in preparation for the succeeding execution of the program, it is detected whether knocking occurred in the current cycle. Following this, in step 412, it is determined whether the actual ignition timing $\theta ig$ is smaller (more retarded) than an ignition timing at which reduction of air induction efficiency is commenced. When knocking has occurred, it is preferable to eliminate it solely by retarding the ignition timing, without reducing the air induction efficiency, since this avoids a large drop in engine output. However, since excessive retardation of the actual ignition timing leads to such problems as increased exhaust gas temperature, in this embodiment knocking is coped with by retardation of the ignition timing up to a prescribed limit ignition timing and if this is not successful, an attempt is made to eliminate the knocking by reducing the air induction efficiency. The ignition timing at which reduction of the air induction efficiency is commenced is appropriately determined taking the engine characteristics and the like into consideration.

In the step 412, when it is determined that the actual ignition timing θig is more retarded than the ignition timing, the engine speed is calculated in step 414 and the calculated engine speed is compared with a prescribed reference engine speed in step 416. If this comparison shows that the engine is operating in a high speed region, the bypass valve in the auxiliary intake passage is driven in the closing direction, and if it shows that the engine is operating in a low speed region, the bypass valve is driven in the opening direction, whereby the air induction efficiency is reduced and knocking is avoided (steps 416–420).

In this embodiment, since knocking is first coped with by regulating the ignition, it is advantageously possible to carry out the control so as to avoid knocking while at the same time holding reduction in engine output to the very minimum. Moreover, even when the air induction efficiency is reduced, it is reduced in small increments in accordance with the knocking intensity so that the reduction in engine output is held to the minimum necessary.

The present invention has thus been shown and described with reference to specific embodiments. However, it should be noted that the present invention is in no way limited to the details of the described arrangements but changes and modifications may be made without departing from the scope of the appended claims.

What is claimed is:

1. A variable air induction control system for a multi-cylindered internal combustion engine, comprising:
   a first means disposed in the vicinity of the cylinders of the engine for respectively detecting a combustion state therein;
   a second means for receiving an output signal of the first means and for generating a signal indicative of a pressure in the cylinders;
   a third means disposed in a rotational shaft of the engine for detecting an angular position of a crankshaft to generate a signal indicative of the engine speed;
   a first air intake passage provided upstream of a throttle valve for introducing an air into the chambers;
   a second air intake passage connected to said first air intake passage at one end and at the other end thereof to the cylinders, said second air intake passage having a variable diameter and length;
   control means for receiving the output signals from said second and third means, and for outputting a setting signal to set the diameter and length of said second air intake passage such that the cylinder pressure is constantly maximized; and
   an actuator means receiving said setting signal from said control means for adjusting said second air intake passage to have diameter and length in accordance with said setting signal.

2. The variable air induction control system of claim 1, wherein said aotuator means has valve means and said control means compares a detected engine speed with a reference speed and further compares a detected current pressure for a cylinder with that detected previously for the same or other cylinder and when it is found that the detected speed is less than the reference speed and the current pressure is less than that detected previously, determines to drive the valve means in a closing direction such that said second air intake passage becomes relatively long and narrow, while determining to drive the valve means in an opening direction such that said second air intake passage becomes relatively wider and shorter than that in the lower engine speed when it is found that the detected speed is greater than the reference speed and the current pressure is less than that detected previously.

3. The variable air induction control system of claim 2, wherein said previously detected pressure value is a pressure value detected previously from the same cylinder.

4. The variable air induction control system of claim 2, wherein said control means outputs said setting signal to drive said valve means in the opening direction when the current pressure is greater than that detected previously in the lower engine speed, while outputting said setting signal to drive said valve means in the closing direction when the current pressure is greater than that detected previously in the higher engine speed.

5. The variable air induction control system of claim 4, wherein said previously detected pressure value is a pressure value detected previously from the same cylinder.

6. The variable air induction control system of any one of claims 1–5, wherein the opening/closing of the valve means is carried out in small increments according to the deviation of the pressure.

7. The variable air induction control system of cliam 2, further including a fourth means for receiving an output signal of the first means for detecting occurrence of a knock condition and wherein said control means, upon receipt of an output signal of said fourth means, determines to drive said valve means in the opening direction if the knocking condition is detected when the current pressure is less than that detected previously in the lower engine speed, while determining to drive valve means in the closing direction if the knock condition is detected when the current pressure is less than that detected previously in the higher engine speed.

8. The variable air induction control system according to claim 7, wherein the opening/closing of the valve means is carried out in small icnrements according to the deviation of the pressure or the intensity of the detected knock condition.

9. A variable air induction control system for an internal combustion engine, comprising;
   (a) means for detecting combustion state of a combustion chamber of the engine disposed in the vicinity thereof;
   (b) means for detecting occurrence of knocking on the basis of the output of the combustion tate detection means;
   (c) a main air intake passage means for introducing air into the combustion chamber through an air cleaner;
   (d) an auxiliary air intake means branched of the main air intake passage means for introducing air into the combustion chamber through the air cleaner;
   (e) a valve means provided at an appropriate portion of the auxiliary air intake means for controlling air flow rate through the auxiliary air intake means;
   (f) means for controlling opening/closing of the valve means on the basis of the outputs of the knocking detection means; and (g) a valve actuating means for driving the valve means in response to the output of the valve opening/closing control means;

said control means controlling the degree of opening/closing of the valve means so as to eliminate knocking.

10. A system according to claim 9 wherein the opening/closing of the valve means is carried out in small increments in proportion to the intensity of the knocking.

11. A system according to claim 9 wherein said internal combustion engine is multicylindered and said control is carried out separately for each cylinder.

12. A system according to claim 9 further comprising means for detecting the pressure in the cylinder on the basis of the output of the combustion state detection means, the degree of opening/closing of the valve means being controlled to maximize the cylinder pressure while eliminating knocking.

13. A system according to claim 12 wherein the opening/closing of the value means is determined by comparing the pressure with that detected previously.

14. A system according to claim 13 wherein the opening/closing of the valve means is carried out in small increments in proportion to the intensity of the knocking.

15. A system according to claim 13 wherein the opening/closing of the valve means is carried out in small increments in proportion to the cylinder pressure.

16. system according to claim 13 wherein the opening/closing of the valve means is carried out in small increments in proportion to the intensity of the knocking and the cylinder pressure.

17. A system according to claim 12 wherein said internal combustion engine is multicylindered and said control is carried out separately for each cylinder.

18. A system according to claim 12 further comprising an ignition device, the first measure taken to eliminate knocking being retardation of ignition timing.

19. A system according to claim 18 wherein said internal combustion engine is multicylindered and the ignition timing is controlled separately for each cylinder.

20. A method for variably controlling air induction in an internal combustion engine having an auxiliary air intake passage, comprising the steps of:
(a) detecting pressure of a combustion chamber of the engine;
(b) comapring the pressure with a prescribed value; and
(c) controlling air flow rate through the auxiliary air intake passage in response to the comparison in such a manner that the pressure is constantly maximized.

21. A method according to claim 20, further comprising the step of detecting occurrence of knocking and the air flow rate is controlled to maximize the pressure while eliminating knocking.

22. A method according to claim 20 or 21, wherein said prescribed value to be compared with the pressure is that detected previously.

* * * * *